(12) United States Patent
Henson et al.

(10) Patent No.: US 8,633,933 B2
(45) Date of Patent: *Jan. 21, 2014

(54) SYSTEM AND METHOD OF PRODUCING AN ANIMATED PERFORMANCE UTILIZING MULTIPLE CAMERAS

(71) Applicant: Jim Henson Company, Inc., Hollywood, CA (US)

(72) Inventors: Brian Henson, Hollywood, CA (US); Jeff Forbes, Valencia, CA (US); Michael Babcock, Los Angeles, CA (US); Glenn Muravsky, Studio City, CA (US); John Criswell, Tujunga, CA (US)

(73) Assignee: The Jim Henson Company, Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/665,716

(22) Filed: Oct. 31, 2012

(65) Prior Publication Data

US 2013/0100141 A1 Apr. 25, 2013

Related U.S. Application Data

(63) Continuation of application No. 11/777,979, filed on Jul. 13, 2007, now Pat. No. 8,339,402.

(60) Provisional application No. 60/807,497, filed on Jul. 16, 2006.

(51) Int. Cl.
*G06T 13/00* (2011.01)

(52) U.S. Cl.
USPC .......................... 345/473; 345/419; 345/420

(58) Field of Classification Search
None
See application file for complete search history.

(56) References Cited

U.S. PATENT DOCUMENTS

| 5,588,139 | A | * | 12/1996 | Lanier et al. ...................... 703/1 |
| 5,790,124 | A | * | 8/1998 | Fischer et al. ................ 345/629 |
| 5,889,550 | A | * | 3/1999 | Reynolds ..................... 348/139 |
| 6,072,496 | A | * | 6/2000 | Guenter et al. ............... 345/419 |
| 6,115,052 | A | * | 9/2000 | Freeman et al. ............... 345/473 |
| 6,377,281 | B1 | * | 4/2002 | Rosenbluth et al. .......... 715/700 |
| 6,552,729 | B1 | * | 4/2003 | Di Bernardo et al. ........ 345/473 |
| 7,068,277 | B2 | * | 6/2006 | Menache ...................... 345/473 |
| 7,307,655 | B1 | * | 12/2007 | Okamoto et al. .......... 348/222.1 |
| 7,403,220 | B2 | * | 7/2008 | MacIntosh et al. ........ 348/208.2 |
| 2003/0016222 | A1 | * | 1/2003 | Budin et al. .................. 345/473 |
| 2003/0034980 | A1 | * | 2/2003 | Imagawa et al. ............. 345/474 |
| 2006/0106494 | A1 | * | 5/2006 | Alvarez et al. ................ 700/251 |

* cited by examiner

*Primary Examiner* — Said Broome
(74) *Attorney, Agent, or Firm* — Davis Wright Tremaine LLP; George C. Rondeau, Jr.; Bobby B. Soltani

(57) ABSTRACT

A real-time method for producing an animated performance is disclosed. The real-time method involves receiving animation data, the animation data used to animate a computer generated character. The animation data may comprise motion capture data, or puppetry data, or a combination thereof. A computer generated animated character is rendered in real-time with receiving the animation data. A body movement of the computer generated character may be based on the motion capture data, and a head and a facial movement are based on the puppetry data. A first view of the computer generated animated character is created from a first reference point. A second view of the computer generated animated character is created from a second reference point that is distinct from the first reference point. One or more of the first and second views of the computer generated animated character are displayed in real-time with receiving the animation data.

22 Claims, 10 Drawing Sheets

SYSTEM AND METHOD OF PRODUCING AN ANIMATED PERFORMANCE UTILIZING MULTIPLE CAMERAS

CROSS REFERENCE TO RELATED APPLICATIONS

This application is a continuation of application Ser. No. 11/777,979, entitled "System and Method of Producing an Animated Performance Utilizing Multiple Cameras," filed Jul. 13, 2007, which claims the benefit of U.S. Provisional Patent Application No. 60/807,497, entitled "System and Method of Animating a Character Through a Single Person Performance," filed on Jul. 16, 2006, the contents of which are incorporated herein by reference in their entirety.

BACKGROUND OF THE INVENTION

1. Field of the Invention

The present disclosure relates to a system and method for creating computer animation performances in real time, and simulating multiple camera views or angles.

2. Description of the Related Art

Creating computer animated performances such as televisions shows and movies can be an extremely time consuming and expensive process. One approach for creating computer animations involves creating animations on a frame by frame basis, and is perhaps the most time consuming.

In a current approach for animating a computer generated character, motion capture is used to record a performer's movements. Further, the character's body is animated based on the recorded movements. The performer typically wears a motion capture suit having a plurality of markers, each of which are usually located near a joint to identify the motion by the positions or angles between the markers. The markers, which may be acoustic, inertial, light emitting diode ("LED"), magnetic or reflective markers, or combinations of any of these, are tracked by sensors and/or cameras. Computer software translates the positions, angles, velocities, accelerations of the markers, thereby providing an accurate digital representation of the motion of the performer.

Yet another approach includes translating hand puppetry movements to computer motion data and generating a computer generated character based on the hand puppetry movements. Such an approach is described in U.S. Pat. No. 6,377,281 and is hereby incorporated by reference in its entirety. In the method and apparatus disclosed in U.S. Pat. No. 6,377,281, performer movement information is received at a computer from a manual input device that receives live manual manipulations from a performer. Generally, the manual input device includes a plurality of position transducers, such as analog position transducer potentiometers mounted in a mechanical assembly that simulate the motions used by a puppeteer to manipulate a conventional puppet. The mechanical elements or physical controls are directly manipulated by a performer, and the electromechanical transducers convert mechanical motion of the mechanical elements into proportional electrical signals.

For example, the hands of a performer are received in left-hand and right-hand mechanical assemblies that include levers, rotatable shafts, tiltable plates, and related equipment. The mechanical assemblies may include a gyro waldo, stick, arm waldo, etc. The mechanical assemblies can be manually manipulated through a range of positions that are homologous to the positions through which the hands of a performer move when manipulating a conventional hand puppet, electromechanically actuated puppet or other artificial creature. For example, the mechanical input device may include one or more joysticks, data gloves, pushbuttons, or other elements to receive mechanical movement and generate electrical signals.

However, a significant problem with creating computer animated performances is that the artist cannot view the result of his or her creation in real time. For example, the motion capture stage is usually a blank stage with little or no props. In a real-life scene, actors interact with physical props, other actors, and can easily visualize their surroundings in a scene. Motion capture performers effectively cannot see their surroundings in a scene, as the surroundings are computer generated and not viewable in the real world on stage. All the motion capture performer sees is a black stage, perhaps with some indication of boundaries within the scene.

Therefore, it can be a challenge for the performer to provide realistic looking movements within a scene. If the performer needs to interact with an object or another character, the performance can be even more complicated. There are often no physical props or other characters on the stage in a motion capture performance. The performer typically tries his best to visualize what the surroundings of the scene would look like, but the resultant performance is often not ideal. There is significant guesswork involved in providing a motion capture performance. The performer must do his best to perform about a blank stage, and can only review the animated results of his performance at a later time, once the performance has been completed. If it is decided the performance is not ideal, the performer must try his best to analyze what aspects of the performance need improvement and try the performance again. As a result, this process can still be quite time consuming.

SUMMARY

In one aspect of the disclosure, a real-time method of producing an animated performance is disclosed. The real-time method receives motion capture data from a motion capture device that is configured to be worn on the body of a performer. The motion capture device includes a plurality of markers. Further, the real-time method receives puppetry data from an input device. In addition, the real-time method renders a computer generated animated character in which a body movement is based on the motion capture data, and a head and a facial movement are based on the puppetry data. The real-time method also creates, from a first reference point, a first view of the computer generated animated character. Further, the real-time method creates, from a second reference point that is distinct from the first reference point, a second view of the computer generated animated character. In addition, the real-time method displays the first view of the computer generated animated character in real-time with receiving the motion capture data and the puppetry data. The real-time method also displays the second view of the computer generated animated character in real-time with receiving the motion capture data and the puppetry data.

In another aspect, a real-time method of producing an animated performance is disclosed. The real-time method receives animation data to animate a computer generated character. Further, the real-time method creates, from a first reference point, a first view of the animated computer generated character. In addition, the real-time method creates, from a second reference point that is distinct from the first reference point, a second view of the animated computer generated character. The real-time method also displays the first view of the animated computer generated character in real-time with receiving the animation data. Further, the real-time method displays the second view of the animated computer generated character in real-time with receiving the animation data.

In yet another aspect, a system of producing an animated performance in real-time is disclosed. The system includes an animation module configured to receive data representative of one or more movements made by a performer in real-time with the movements. The animation module further renders a computer generated character, the movements of the computer generated character being based upon the one or more movements made by the performer. The system further comprises a software module configured to create a first view and a second view of the computer generated character, the first view being based on a first reference point, and the second view being based on a second reference point. In one aspect, the first reference point is distinct from the second reference point. The system also comprises a first controller configured to receive an input to modify the first reference point and communicate the input to modify the first reference point to the software module. A second controller configured to receive an input to modify the second reference point and communicate the input to modify the second reference point to the software module is also provided. The software module further is configured to update the first view and the second view based upon a modification to the first or second reference points.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which.

DETAILED DESCRIPTION

A system and method are disclosed for producing an animated performance in real-time. In particular, a multiple camera system and method are disclosed that allow different views of an animated Computer Graphics ("CG") character. A description of the process involved in animating a computer generated character performance is now provided with reference to FIGS. 1-3. The animation process can be divided into three main steps or areas: pre-production, stage production, and post-production.

Figure 1:
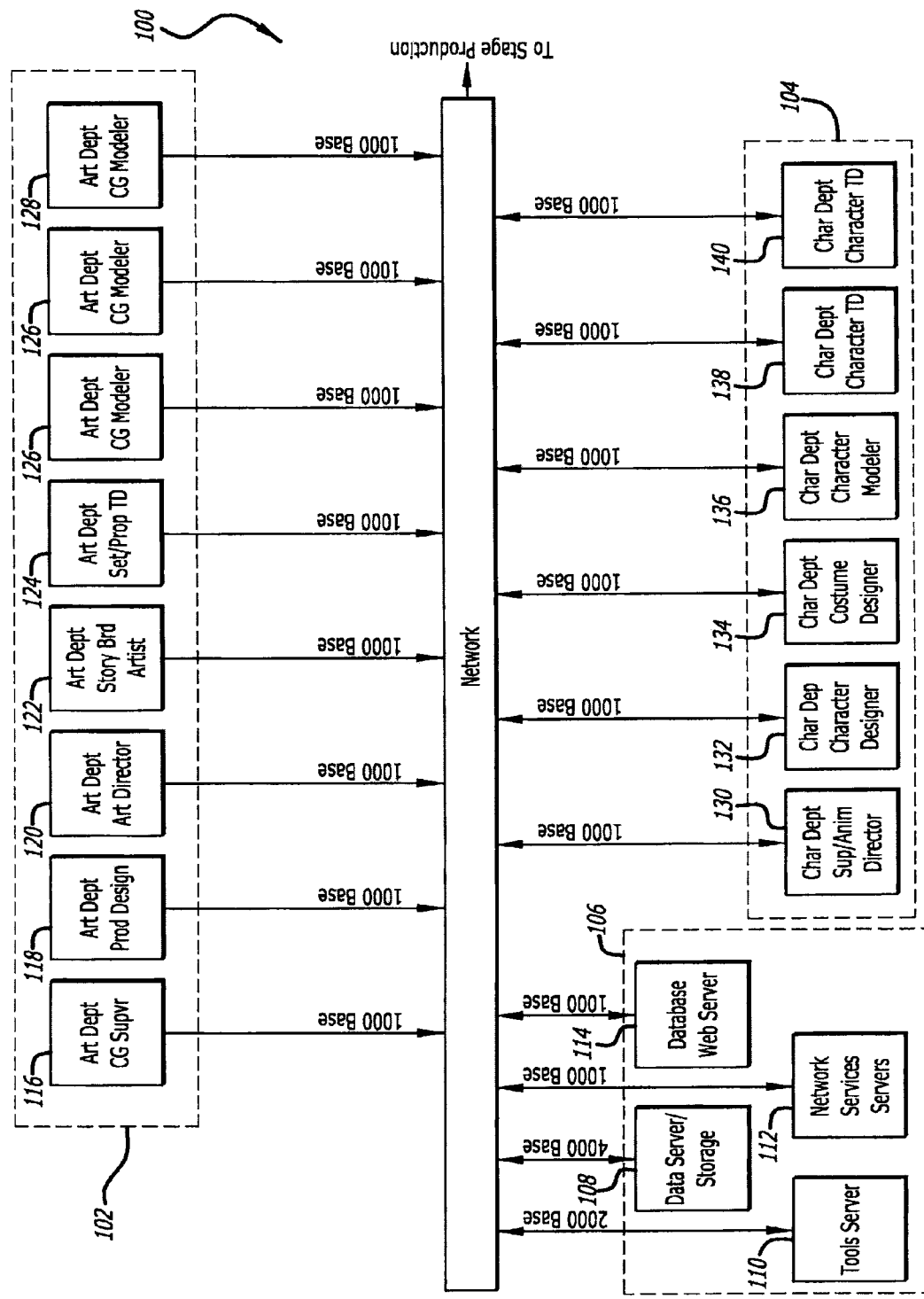
FIG. 1 illustrates a block diagram illustrating a pipeline of the pre-production portion of the animation process.

FIG. 1 is a block diagram illustrating a pipeline 100 of the pre-production portion of the animation process. Pre-production involves the creation of the digital assets for a production, e.g., a television show or movie. Examples of assets are computer generated ("CG") characters, CG models, CG props, CG sets, etc. In one embodiment, the assets are created in a CG/3-D modeling software package. A group of individuals, under the direction of various supervisors, builds the models, characters, props and sets. The assets are typically stored in a large data server. The pre-production process generally involves departments such as an art department 102 and a character department 104. The art department 102 and the character department 104 can be physically located almost anywhere as long as they have access to the main production network.

In one aspect, data related to the production is stored in a data server storage system that may be physically located in a corporate server room location 106. The data server storage system can include a plurality of remote file servers for data storage. For example, the server room 106 has a data server/storage 108 that can store data. In one embodiment, the data server/storage 108 can store several terabytes of data. All of the assets are stored on the data server/storage 108 for storage. The assets are accessed through the data server/storage 108 through all three portions of the pipeline: pre-production, post-production and the stage production. Further, the corporate server room 106 can have a tools server 110, which is a server that has custom tools and plug-ins for a variety of different applications to help expedite both the pre-production and the post-production processes. In addition, the corporate server room 106 has a plurality of network servers 112 to perform general networking, monitoring and controlling functions. The corporate server room 106 can also include a custom database 114. The custom database 114 allows tracking, versioning and task assignments throughout the whole production pipeline. For example, the database tracks tasks and related assignment information such as to whom the task was assigned, and who assigned the task. An approval process is utilized so that once a task has been completed, the task is marked as completed, and approval is requested. If approval is obtained, the completed task is provided to the next person in a responsibility chain. If approval is not obtained, the task is provided, with notes, back to the person assigned to do the task.

The art department 102 and the character department 104 utilize the database 114 to tracks all work performed within the departments. The art department 102 includes a group of artists responsible for creating the look of the set and props used in the various scenes of a show. In one embodiment, the art department 102 of an episodic television show may have approximately six to ten people. An art department CG Supervisor 116 oversees the various artists within the art department, which includes but is not limited to a production designer 118, a director 120, a story board artist 122, a set/prop technical director 124, a CG modeler 126, and a texture painter 128. Further, there may be more than just one of these people in the art department 102. For example, as illustrated in FIG. 1, there may be a plurality of CG Modelers 126 within the art department 102.

The art department production designer 118 usually works with the look of a scene, including sets, rooms, etc. The art department production designer 118 can work closely with the art department art director 120, who designs elements of the set according to the direction of the art department production designer 118. The art department set/prop technical director 124 oversees the setup and rigging of props, i.e., how the props may be attached to the characters or how the rigs are working rig-wise if rigs are to be motion captured. Motion capture props can be utilized within this concept of performing on the stage. Further, the art department CG modeler 126 is responsible for physically creating what the art director 120 and production designer 118 are visualizing. The art department's production designer 118 and art director 120 may be working in a 2-D environment, and it is the responsibility of the CG Modeler 126 to bring that 2-D vision into a 3-D realm. There may be more than one CG Modeler 126 sharing the workload. For instance, the CG supervisor 116, production designer 118, and art director 120 may assign a cast to two CG modelers 126. In addition, the art department texture painter 128 takes the 3-D models and, based upon the visuals the art director 120 is looking for, creates different textures. For example, the texture painter 128 can create a wallpaper texture look, a stucco ceiling look, a wood look painted upon what looks like a log home or a wooden floor. The art department story board artist 122 works in conjunction with the producers and directors. The storyboard is created at the end of a script so the producers and directors have a good idea visually of what they plan to capture through the lens when they get to the stage production portion of the animation process.

While the art department 102 is dealing with sets and props, the character department 104, by definition, is dealing with just the characters. A character department supervisor/animation director 130 looks at how the characters are created and how the characters are supposed to move. A character designer 132 and a costume designer 134 work on creating the design of the character as well as the costume design for the character. In addition, a character department CG modeler 136 transforms the vision of the character designer 132 and costume designer 134 from a 2-D perspective into a 3-D perspective. In one aspect, a 3-D sculpture is made from the 2-D flat work. The 3-D sculpture can be laser-scanned to generate a cloud of data points that can be utilized to generate a mesh for a character. The character department character modeler 136 can utilize the mesh to start modeling. A character department technical director 138 can then utilize the 3-D model of the character to rig and generate a mesh for a character. The character department technical director 138 also implements intended expressions for the character. As a result, a fully rigged and performable character is created. For example, the lips of a character can be made performable such that they perform lip-syncing to a person's voice. The fully rigged character can now be utilized within the rest of the pipeline infrastructure, including the stage and the post-production processes. Of course, there may be more than one person of the same or similar positions in the character department 104. For instance, as illustrated in FIG. 1, there may be two character department technical directors 138 and 140.

Figure 2A:
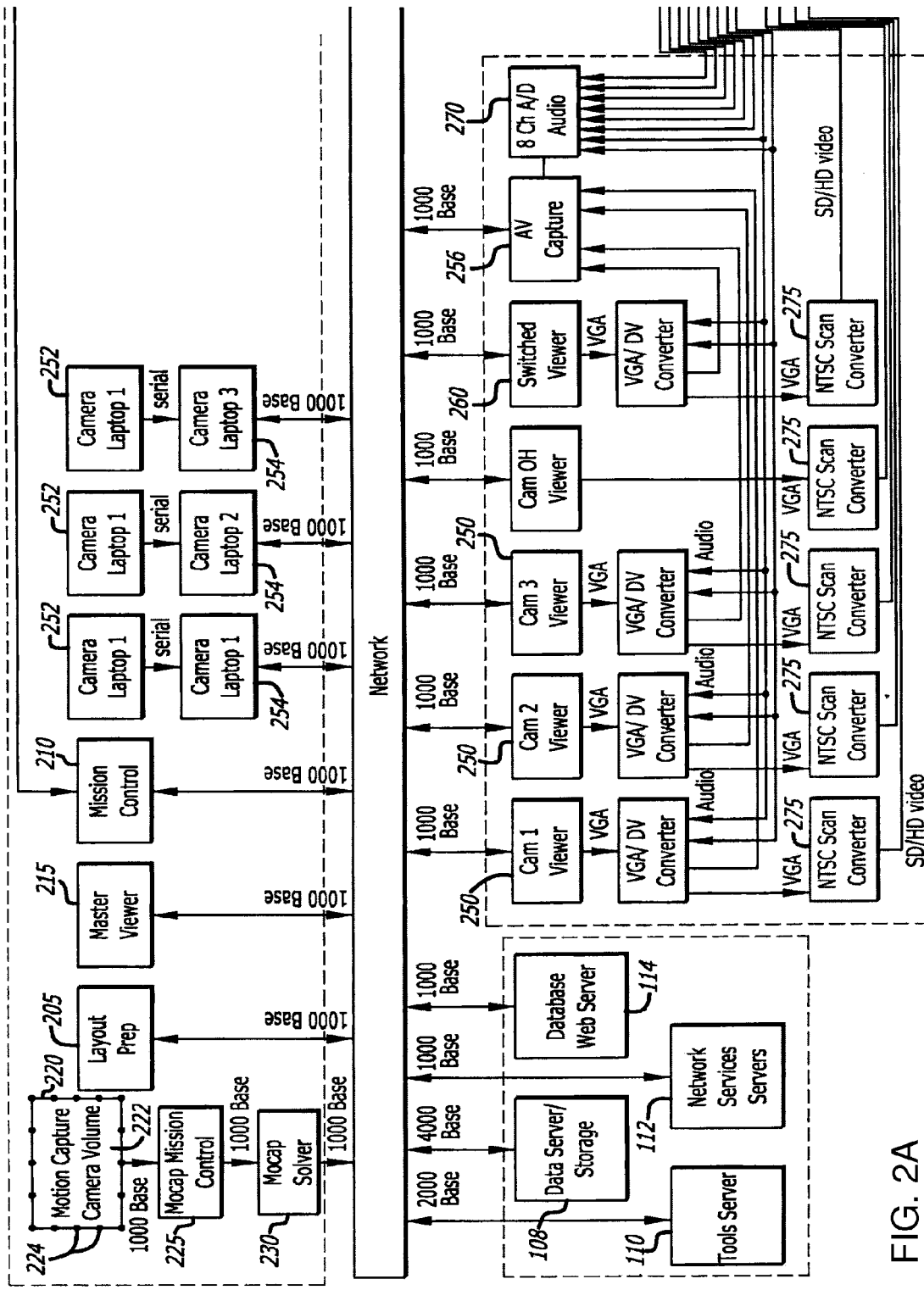
FIGS. 2A and 2B illustrate a block diagram illustrating an embodiment of the stage-production portion of the animation process.
Figure 2B:
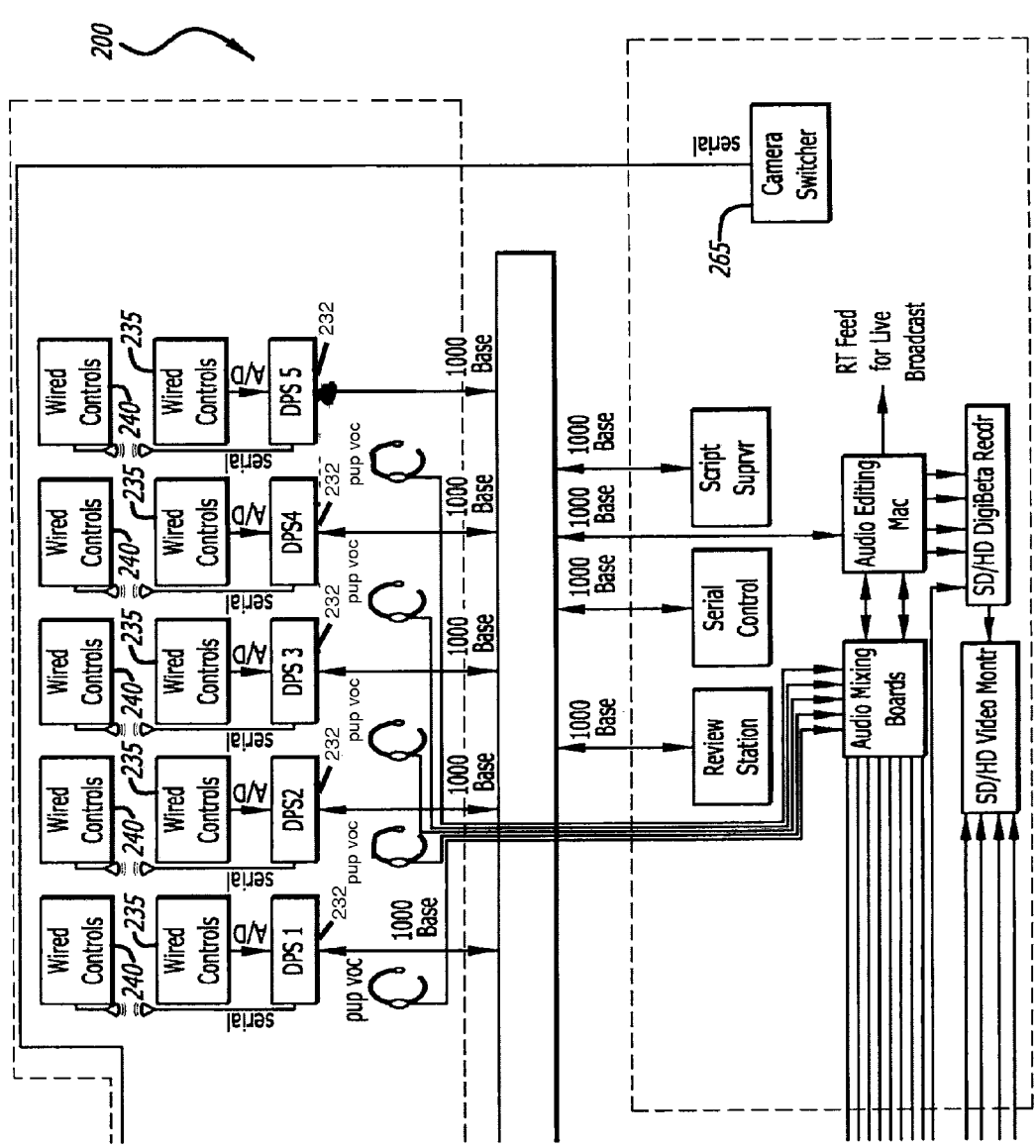

FIGS. 2A and 2B are a block diagram illustrating an embodiment of the stage-production portion 200 of the animation process. The stage production portion of the process is where performers create or perform the movements used to animate the CG characters.

Most of the stage production process physically occurs at a soundstage production floor location 202. Before the character performance begins, the assets and layout required for the CG scene or set are retrieved. The layout prep computer 205 is where assets required for a scene, such as CG background sets, props, and character information are retrieved from the data server 108 where they were stored during pre-production. Based upon what is required for a scene, a person calls up sets, props and characters based upon what that shooting day's requirement is. For example, a bedroom set or scene might involve retrieving assets such as bedroom furniture.

Next, specific character assets are retrieved. For example, characters A and B are being used. This can be accomplished through working in a CG software package such as Autodesk® Maya®. When the scene is assembled, the scene is passed on to mission control 210, where it is viewed through the master viewer 215. In such an environment, the computers and operators can still manipulate and make changes within the set down to the last moment before character performance and recording begins, based upon the producer or director's final input.

Once all the assets required for a scene have been retrieved and properly laid out using the layout prep computer 205, the character performance is ready to be introduced. Character performance generally consists of one or more performers performing various movements, the movements being used to animate a CG character. In one embodiment, a single performer operating within a motion capture stage provides movement data for a portion of one character, while a second performer provides movement data for another portion of the character through methods other than motion capture. For example, a first performer wears a motion capture suit and moves around the motion capture stage to provide overall body movements for the character. However, a second performer, usually outside of the motion capture stage, operates hand controls to provide movement data for the head, facial expressions, and hands of the character. In some embodiments, however, a single performer may be used to provide all the movements necessary for a character.

The soundstage floor 202 includes a motion capture system 220 which consists of a floor area, or motion capture stage 222 surrounded by a plurality of cameras 224 which track the position of markers located within the floor area 222. In one embodiment, the motion capture stage 222 is a volume of forty feet by forty feet and utilizes 28 digital cameras 224. Although motion capture usually runs through software specific to a particular a motion capture company, it should be noted that the motion capture system 220 is not limited to any particular hardware, software, manufacturer or set of equipment. The motion capture system 220 is a simply a module that can be plugged into the overall animation process. Motion capture data based on the performer movement information is streamed to the master viewer 215 and is recorded by the motion capture mission control device 225. The motion capture data is then transmitted to a motion capture solver 230. The motion capture solver 230 is software and/or hardware dedicated to "solving" the skeleton of the motion capture performer, and whatever props may be within the motion capture volume, in as close to real time as possible. The solver addresses a common problem faced by animators of scaling and retargeting motion-capture data to adjust different proportions between the performer and the computer-generated ("CG") character. The motion capture solver 230 applies motion-capture data to a fixed bone-length skeleton, compensating for local motion-capture marker movements and mathematically solving for the difference in the actor's and CG character's proportions. That solved skeleton is then streamed over the network into mission control 210, where it is then plied onto the skeletons of the CG characters to be animated as represented by the performers.

Digital Performance Systems 232 (DPS 1 through 5 shown in FIG. 2B) are where performers such as puppeteers work to create the facial animation, lip synch, and audio vocalizing of the characters that they represent. A digital performance system includes hardware and software which allows one puppeteer to control the many movements of an animatronic or computer generated character. Generally, one performer operates one digital performance system 232, to provide the motions for one character. The puppeteers use a variety of input devices, which may be wired or wireless controls. Input devices may include one or more analog position transducer potentiometers mounted in a mechanical assembly that simulates the motions used by a puppeteer to manipulate a conventional puppet. Input devices may include sticks, waldos, footswitches, and other mechanical elements or physical controls that are directly manipulated by a performer, and the electromechanical transducers that convert mechanical motion of the mechanical elements into proportional electrical signals.

For example, the hands of a performer are received in left-hand and right-hand mechanical assemblies that include levers, rotatable shafts, tiltable plates, and related equipment. The mechanical assemblies may include a gyro waldo, stick, arm waldo, etc. The mechanical assemblies can be manually manipulated through a range of positions that are homologous to the positions through which the hands of a performer move when manipulating a conventional hand puppet, electromechanically actuated puppet or other artificial creature.

In one embodiment, a stick is used to control gross motor functions of body parts of the creature, and a waldo is used to control opening and closing the mouth and to control other facial features of the creature. A stick typically has a left/right movement transducer, a forward/back movement transducer, a twist transducer, and one or more finger transducers associated with upward or downward movement of a performer's fingers. The stick may also have a thumb control that is often used to perform eye movements. A waldo may have a thumb transducer, jaw transducer, palate transducer, up/down movement transducer, left/right movement transducer, and twist transducer. Shoulder, elbow, wrist, and other movements may be accommodated and associated with transducers.

Alternatively, other devices may be used to convert performance movements into electrical signals. For example, a performer could wear a data gloves, use one or more joysticks, pushbuttons, or other elements to receive mechanical movement and generate electrical signals.

Any of these input devices can be modified to communicate wirelessly. Therefore, there are also wireless controls 240 that communicate via a wireless serial stream. For example, wireless finger controllers may be worn by the motion capture artists out in the motion capture volume. The wireless finger controllers are gloves that receive the fingers of the performer and the finger movements of the performer are transmitted via wireless serial stream back to the digital performance system.

The motion capture area is primarily for the motion capture artists, who are responsible through their motion capture suits and markers for creating body movement of the character. Therefore, in one embodiment there is a two-person team that is animating a single CG character. A motion capture performer provides body gross movements, walking around, interacting with the set. A puppeteer using a digital performance system 232 provides facial movements, expressive lip-synching, finger movements, and voice. In another embodiment, a single performer simultaneously provides both the motion capture data and the puppet data to provide all the animated movements for a CG character.

The performer movement data, regardless of whether it is motion capture data, or other input device data, is used to animate a CG character. Therefore, using such data, the animated CG character is rendered along with the set/scene as laid out earlier. This rendering of the animated CG scene is done in substantially real-time, and is displayed on the master viewer 215. The performers are thereby able to watch the animated CG character result of their performance in real time with their performance. This allows the performer to make adjustments to his or her performance in real time, and results in a more realistic or interesting character result.

A plurality of different views 250 of a scene can be created using software. Each of the plurality views resembles the perspective view as seen from a different camera angle and/or distance. Each of the views that have been created by software are then streamed out to individual computers that are running a variety of viewers 250. In one embodiment, there are three viewers 250: camera viewer one, camera viewer two, and camera viewer three. Each viewer 250 displays a different view or perspective of the scene. For example, the camera one viewer may show a close up view of the character. The camera two viewer could show a wide angle view of the scene from one angle, and the camera three viewer could show another angle. Therefore, the viewers mimic what could be seen by three separately controlled cameras at different camera angles. A camera controller 252 is further associated with each viewer. The camera controllers 252 are custom-built serial devices that mimic a jib arm control, so that a static camera operator from the real world television industry is able to easily work in the CG industry without any re-training.

The camera controllers 252 plug into laptops 254 that run the performance control system, which is a software interface that allows operators, performers to fine-tune their controls so that the sensitivity and the range of motion that they use can be set for those individuals. The performance control system document, or character document, streams into mission control 210 as a performance data stream. Through their camera controllers 252, these cameras are always live and flyable through the 3-D environment and beyond if needed. The cameras and camera controllers 252 are each manned by an operator who is visually in control of their camera view on the monitor in front of them.

All the data streams, from motion capture 222 and from digital performance systems 232, are streamed to mission control 210 where they are recorded and synchronized. Mission control 210 also controls starting and stopping of motion capture so that information recorded through the motion capture system, has the same frame ranges as the rest of the systems. Therefore, mission control 210 aids in synchronizing data so that it can come together and for post-production. Mission control 210 also ensures that the same number of frames is present across data types. Mission control 210 also starts and stops a dedicated audio-visual ("AV") capture system 256.

In one embodiment, the audio system includes an eight channel analog to digital ("A to D") system, for recording eight separate audio tracks 270 and that are fed from the audio department. Track one generally contains production information such as audio from the director, floor manager, script supervisors, etc. Track one may also contain any information regarding timing issues, and might have reference music on it. Track two is generally a mono mix of all the character voices. Tracks three through light are all audio tracks of individual character voices that are used later in the post-production process.

Scan converters 275 take the VGA (analog) signal and scan convert it into a standard definition (SD) or a high definition (HD) format that then feeds into an NTSC video monitor for simple review and reference.

There is a switch camera operator in a control booth that uses a camera switcher 265 to switch between the multiple camera views on the fly. Accordingly, a real time switch or edit is created on the fly based upon rehearsals and blocking from earlier time. As the switching occurs, a dedicated view showing of that switch on the fly is displayed through the switched viewer 260. The switched viewer 260 is generally what most people on the floor, including the director are looking at, since it is essentially a rough edit of the animated production.

Data is recorded back to the data server storage 108, where the data is backed up and made accessible to other departments for a variety of processes.

The camera switcher device 265 is also plugged into mission control via serial cable. Anytime the camera switcher device is used to switch from one camera to another, those switches are noted by mission control, and mission control creates a file of what switch was effected at what time for what camera. This information is also part of the recorded data and is useful in post-process. In post-process, the edit is recreated utilizing the isolated camera feeds instead of the switch feed. As a result, almost everything that is manipulated on the stage is actually recorded to be used in the post process for animating.

The isolated footage from each of the camera viewers 250, for example camera one, camera two, camera three, as well as the switch camera view 260 are all recorded simultaneously. This results in four digital video ("DV") streams. The system records DV footage with audio that is used as a playback system for referencing purposes. Audio channels one and two are converted to a digital signal and, along with the four digital video streams, can be used for playback and review. For example, if a director wants to see previous take, which was shot five minutes ago, the DV footage along with audio and video for reference, can be distributed onto the floor for any areas to be reviewed and played back. The system may also record eight channels of high resolution audio, i.e., twenty four bit at ninety six kHz resolution and eight tracks. This recording is the final audio that is utilized for production.

Figure 3A:
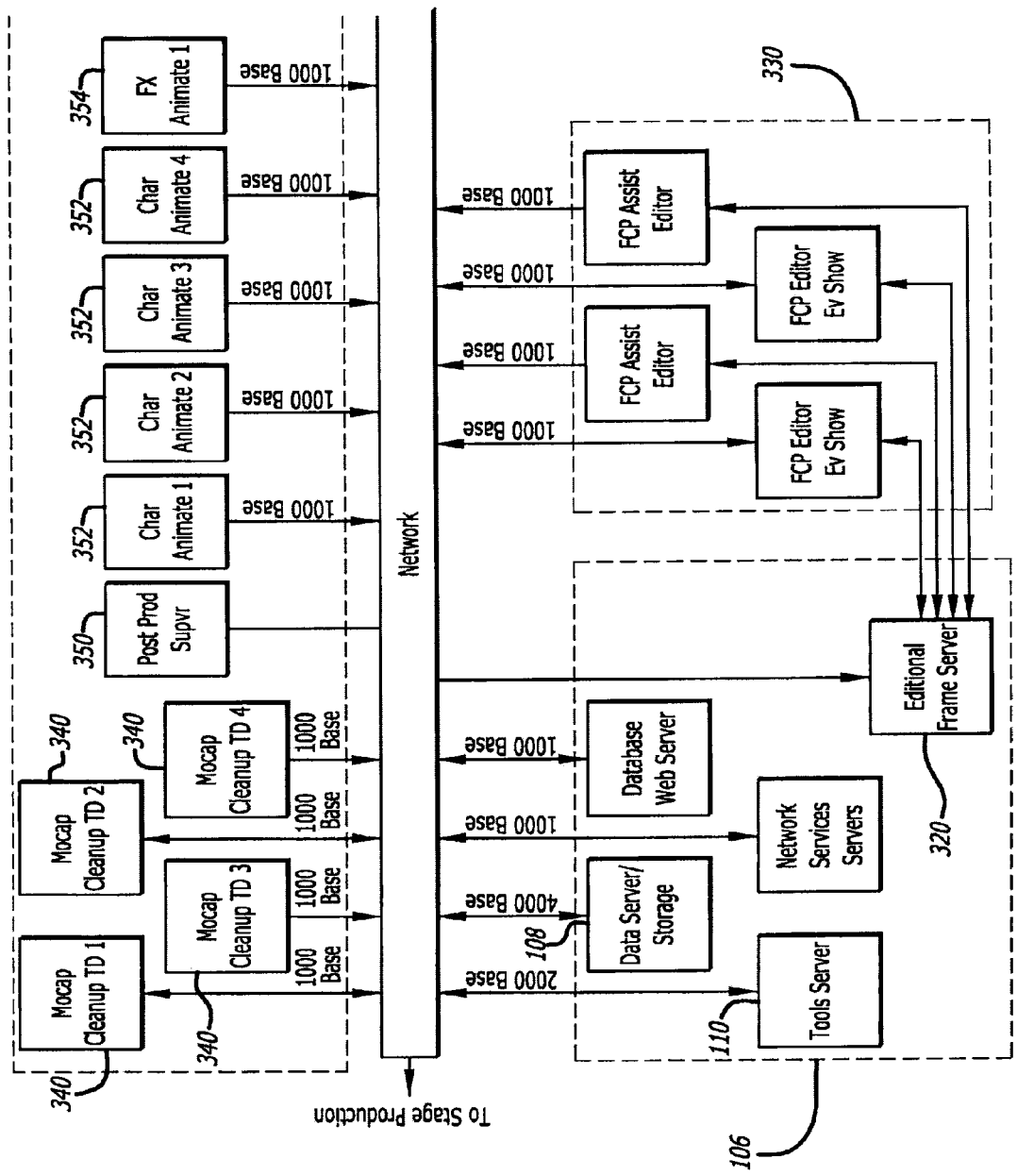
FIGS. 3A and 3B illustrate a block diagram illustrating a pipeline of the post-production portion of the animation process.
Figure 3B:
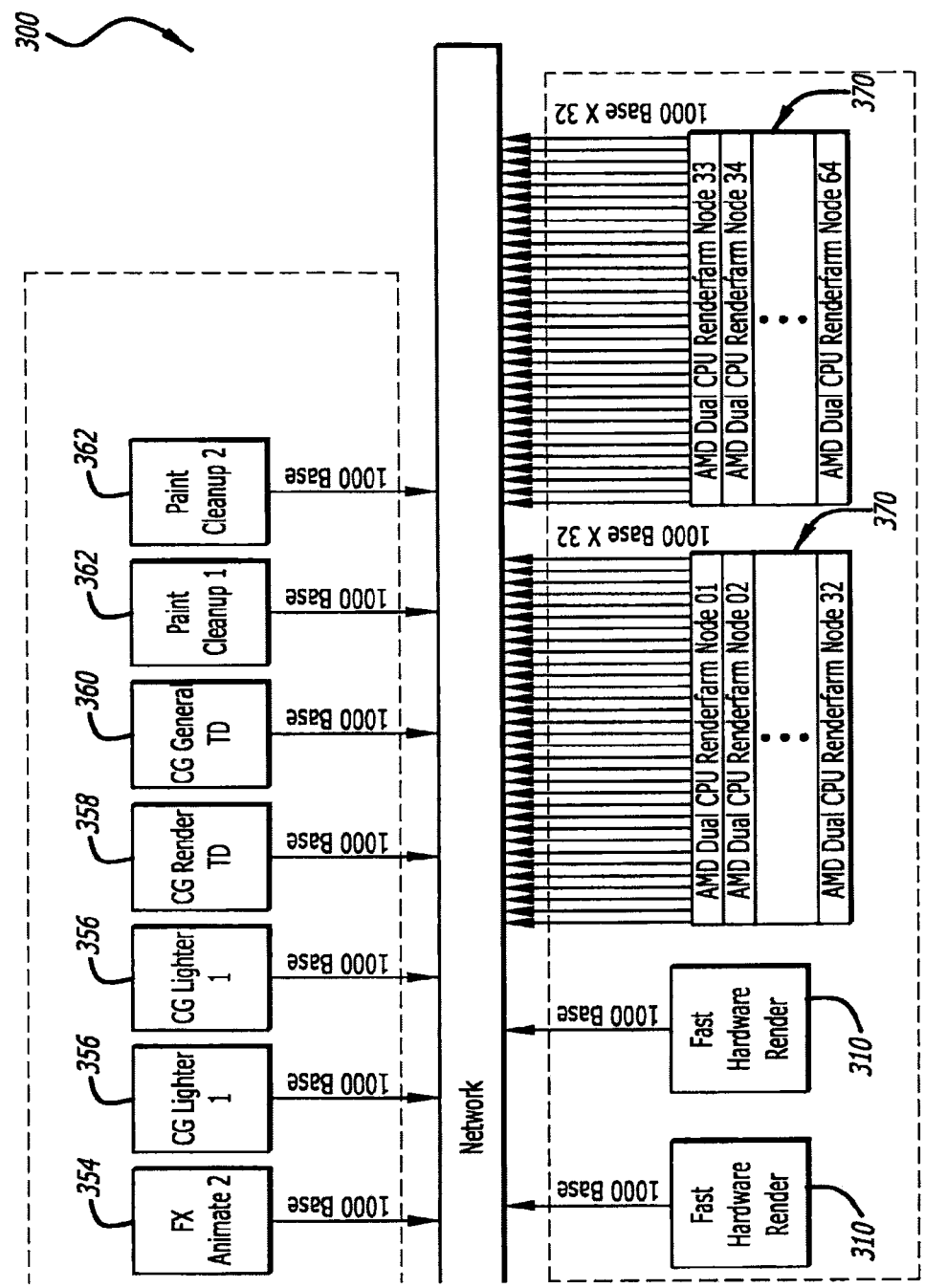

FIGS. 3A and 3B are a block diagram illustrating a pipeline 300 of the post-production portion of the animation process. Post-production is the general term for stages of production happening between the actual recording and the completed television show, film or video. Post-production typically includes cleanup and editing of the audio and video. The post-production phase of creating a film can often take longer than the actual shooting of the film, and can take several months to complete.

As mentioned previously, a rough edit of the show is taken during the stage production process. This is the switched camera view 260. This switched camera view is generally only used for reviewing purposes. During the post-production process, this switched view of a selected take is recreated using higher quality data. Therefore, all of the frames from each of the different camera views that make up the switched view need to be recreated, or re-rendered. A request is thereby transmitted to fast rendering computers 310 to take the scene data as stored on the data server 108, and basically run it all the way through camera one, all the way through camera two, and all the way through camera three. This way, if there is a cut-away from a camera too early or a cutaway from a camera too late, it can be corrected.

The resulting rendered frames are then deposited into an editorial frame server 320. Several editors at editorial bays 330 use editing software such as Apple Computer Inc.'s Final Cut™ Pro ("FCP") to recreate the actual edit so that it matches exactly the one that was seen on stage in real time. The file that recorded the actions of the switch director during stage production switching the camera switch pedals, and data regarding to what frame and on what camera the switch was performed, is imported. Based upon that data, it recreates the edit that was on stage but utilizing three isolated camera feeds for the entire range of the take. Therefore, if the first switch from camera one to camera three occurred too early, the live edit from the stage can be tweaked such that the camera switch occurs at the desired time. A majority of the time the live edit on stage is not perfect, but can be adjusted later in editorial through this process.

Once the edit is complete for an episode, an edit decision list ("EDL") is created, which identifies what frames were used from what takes. The EDL is stored on the data storage server 108 and posted so that the motion capture team 340 has an opportunity to start cleaning up information. It should be noted that up until this point the data is un-cleaned raw data as was recorded on stage. There may likely be glitches, twists, or pops visible in this fast render and this first EDL coming out of the editorial division 330.

Once the range of frames to be used has been determined, that information is passed to motion capture cleanup area 340, where the motion capture data is cleaned up. In some embodiments, the motion capture data is the character's body data. Clean-up only occurs for frame ranges on takes that are visible within edit. There is no clean up performed on frames that are not going to be seen. Once the data is cleaned up, the data is mapped back onto the CG character's meshes and a Maya scene is created that is then passed into the post-production department.

At that point, the head, facial and finger data, along with the audio, is introduced in conjunction with the cleaned-up motion capture data, and several character animators 352 work to start assembling the final scenes of the animation. This is all under the supervision of the post-production supervisor 350. There are also effects animators 354 that work on other things (not necessarily related to character cleanup) such as dropped props within the scene. At this point, the scene should start coming together from an animation perspective, e.g., characters are not passing through props and sets, and characters are interacting properly with each other. For example, characters' hands are not going through the other characters' bodies.

The results of this clean-up are then passed on to the lighters 356 and texturing people who start adding on the final lighting and texturing and effects work, in preparation for the final render. Rendering technical directors 358 start setting up the rendered layers that are going to be utilized to create the final product, whether it be standard definition, high definition, or even analog and National Television Standards Committee ("NTSC") format, in the case of episodic television. This whole team is essentially getting ready for the final look in the final render.

The finalized data is then sent to a large render farm 370, which in one embodiment is made up of sixty four individual computers, each having dual processors. The render farm's sole purpose is to take in the individual frames and render them up to the level required based upon the lighting and texturing and the animation the post-production team managed and provided. The high resolution frames are then used to replace the fast render frames within editorial. The eight-track audio from the stage is used to create a final cut, such that character voices can be processed individually, and balances adjusted, if required.

In a traditional production of a television show or movie, multiple cameras are utilized simultaneously to record the performance of the actors and/or other aspects of the scene. For instance, in a three camera system, three camera operators would be used, each controlling a separate camera angle or view to film the performances of the actors. Accordingly, the director can determine which camera to utilize for different parts of the sequence that is being filmed. However, the traditional multiple camera system is limited to live actors and real-life sets or scenes.

Figure 4:
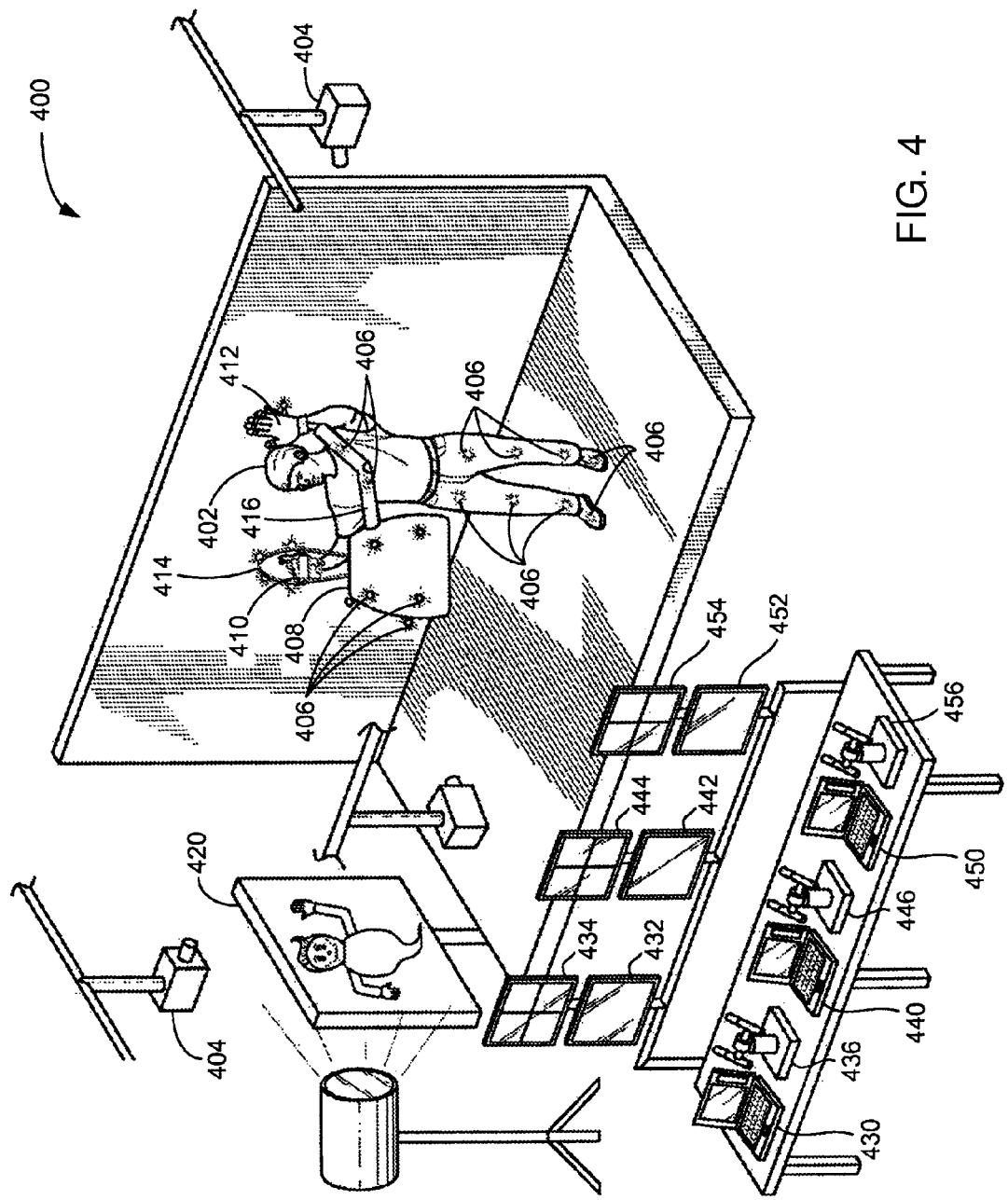
FIG. 4 illustrates a multiple camera system that can be utilized to produce an animated performance of a computer generated character.

FIG. 4 illustrates a multiple camera system 400 that can be utilized to produce an animated performance of a CG character. A performer 402 provides a performance comprising a plurality of movements that are used to animate the CG character. Through the performance, performer movement data, or animation data is provided that is used to animate the CG character. In one aspect, the movements comprise body movements that are captured through a motion capture system. For instance, motion capture cameras 404 can re-create the movements made by the performer 402 by recording the positions of a plurality of markers 406 positioned on the performer 402. The motion capture data can then be provided to one or more computers to animate the CG character according to the motions of the performer 402.

The animation data is not limited to motion capture data. For instance, the animation data may also include puppetry data received from one or more controllers 410, 412 manipulated by the hands of the performer 402. Performer 402 is seen holding a puppet device 408 comprising two controllers 410 and 412, which are configured to receive the fingers and hands of the performer 402. These controllers 410, 412 may be similar to the wired or wireless controls 240 used in connection with the digital performance systems 232, as described earlier in reference to FIG. 2B. The performer 402 provides puppetry movements using these controllers 410, 412 with his or her fingers and hands. In one embodiment, the device 408 comprises a head-hand controller 410 which is used to control facial expressions of the CG character. The device 408 may also comprise a hand-hand controller 412 used to control the hand and finger movements of the CG character. In FIG. 4, the head-hand controller 410 is located within a head portion 414 of the device, and operated by the right hand of the performer. The hand-hand controller 412 is operated by the right hand of the performer, and is connected to an arm portion 416 of the device, thereby allowing the performer to further control motion of a character's arm. In one aspect, the device 408 also comprises a plurality of markers 406, such that the movement of the device 402 is also captured by the motion capture system. For instance, the plurality of markers 406 can be positioned on the legs of the performer 402 such that the performer's leg movements provide the leg movement of the CG character while markers 406 located on the puppet device 408 are used to animate the upper portion of the body of the CG character.

Therefore, in one embodiment, the animation data includes both motion capture data and puppetry data. For instance, the animation data may include motion capture data for the body of the CG character and puppetry data for the facial expressions of the CG character.

The animation data, regardless of whether it is motion capture data, or other input device data, is received by one or more computers, and is used to animate a CG character. Therefore, using such data, the animated CG character is rendered along with the set/scene as laid out earlier. This rendering of the animated CG scene is done in substantially real-time, and is displayed on display 420. The performers are thereby able to watch the animated CG character 422 as a result of their performance in real time with their performance. This allows the performer 402 to make adjustments to his or her performance in real time, and results in a more realistic or interesting character result.

One or more computers, e.g., a first computer 430, a second computer 440, and/or a third computer 450 can be utilized to generate a plurality of distinct views of a CG character and/or the surrounding scene. In one embodiment, the first computer 430, the second computer 440, and/or the third computer 450 can receive animation data to animate the CG character. Each of the computers can perform an instruction on the animation data received from the motion capture cameras 404 and/or other inputs to determine a view of the CG character from a specific reference point. For instance, the first computer 430 can perform an instruction on the animation data to view the CG character from the side. The second computer 440 can perform an instruction on the animation data to view the CG character from the front. Finally, the third computer 450 can perform an instruction on the animation data to view the CG character from an angle.

In one aspect, there may be an animation module for rendering and animating the CG character. There may also be one or more software modules responsible for creating the different views of the animated CG character. The animation module and software module may be executed on one or more computers, and may be executed on the same or different computers. For example, in one embodiment, a software module configured to generate a view of the CG character is present on each of computers 430, 440, and 450. A separate computer may operate an animation module and communicates with each of the computers 430, 440, and 450.

Accordingly, each of the computers can have an associated set of displays to display all of the different views and to select one of the views. For instance, the first computer 430 can have a first view display 432 to display the first view and a conglomerate display 434 to display all the views. A user at the first computer can select a different view for the first view display by looking at the conglomerate display 434. Further, a camera controller 436 allows a user to zoom in on a particular view or even change the angle and/or orientation of a particular view. A software module can be utilized to determine and render the different views from the animation data and to re-orient a view based on input from the camera controller. In addition, the second computer 440 can have a second view display 442 and a conglomerate display 444. Further, a camera controller 446 can adjust the view of the second display 442. The third computer 450 can have a third view display 452 and a conglomerate display 454. A camera controller 456 can adjust the view of the third view display 452. Accordingly, the view or reference point for a particular display is essentially a simulated camera view. The real-time display of the CG character for each camera can be recorded.

Further, the CG character can be provided to a display 420. The performer 408 can view the animated CG performance in real-time as the performer 408 provides the performance.

Figure 5:
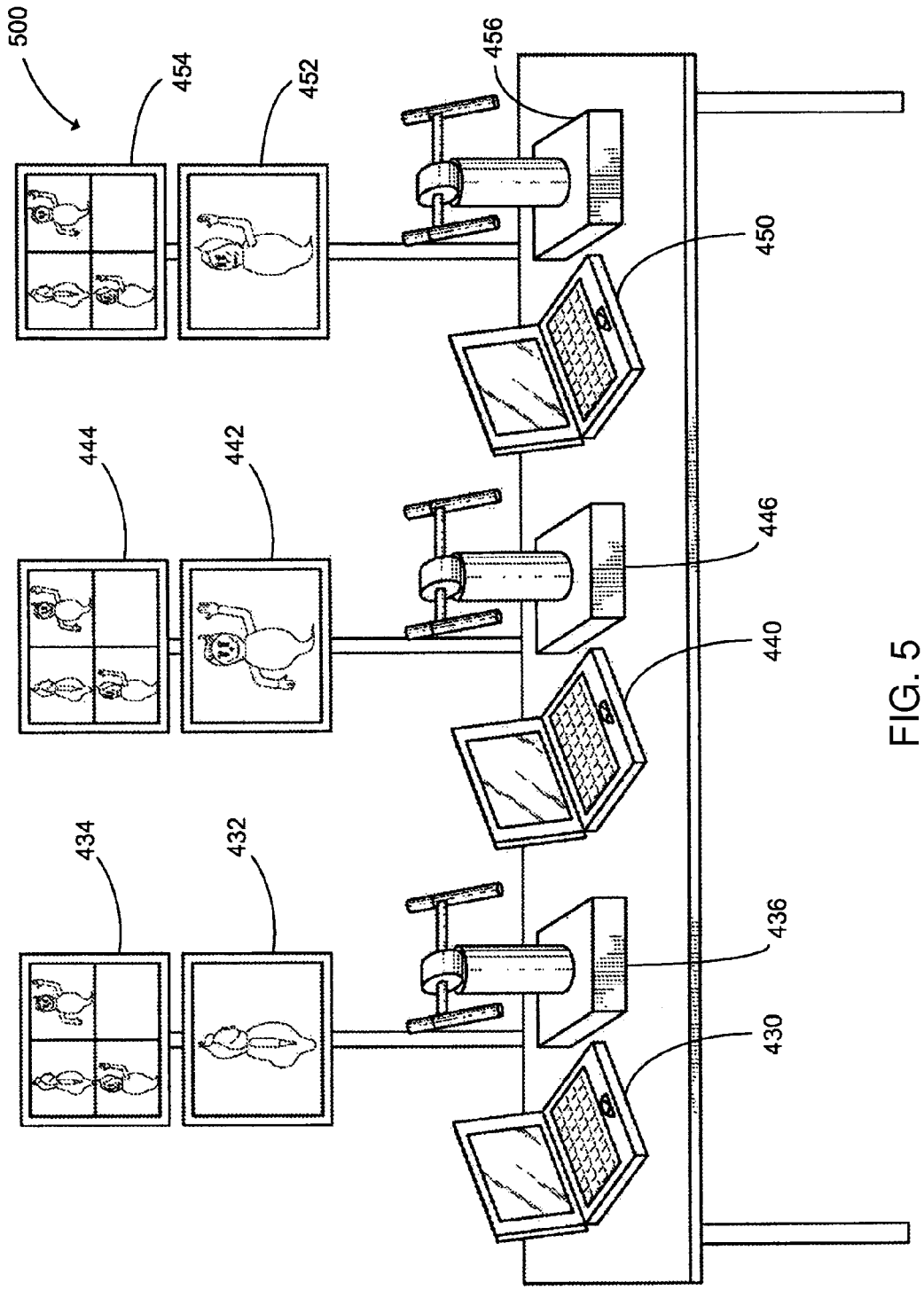
FIG. 5 illustrates a magnified view of the displays associated with the first computer, the second computer, and the third computer.

FIG. 5 illustrates a magnified view 500 of the displays associated with the first computer 430, the second computer 440, and the third computer 450. Each of the displays depicts a view from a different reference point with respect to the CG character. In the example shown in FIG. 5, a first view comprising a side view of the CG character, as controlled using camera controller 436, is shown on display 432. A second view comprising a head on view of the CG character is shown on display 442. A third distinct view comprising a view of the CG character at an angle, is manipulated using camera controller 456, and shown on display 452. Conglomerate displays 434, 444, and 454 show each of the first, second, and third views displayed together on the same display.

A plurality of operators may utilize the computers and camera controllers 436, 446, and 456. For instance, three camera operators can utilize the three camera controllers to control three camera views of a CG scene. The camera controllers allow the operators to dolly in, dolly out, dolly left and right, dolly up and down, pan, tilt, and zoom. The camera controllers resemble the control provided to a film camera dolly or jib arm. Therefore, a camera operator trained to use traditional film cameras can easily operate the simulated camera using camera controllers described herein.

A camera switcher is provided that allows a director to switch between the different views during a performance. The camera switcher may comprise a switch device such as a serial device, which allows for switching between each of the data streams or views. The switch allows the director to create a rough edit of the production on the fly. As the switching occurs, a dedicated display shows the switched view as is currently selected by the switch. The switched view comprises a sequence of the different views, as selected by the director, at different times. The switched view can be considered a rough edit that is performed on the fly during the performance. In one aspect, the switched view is displayed on conglomerate displays 434, 444, and 454, along with each of the individual camera views. In another aspect, display 420, which is provided for the performer to view the animated CG character 422 resulting from his or her performance, displays the switched view.

Each time the switch is activated, the action is recorded by mission control. In one embodiment, each time the switch is activated, an entry is made to a file or database detailing what switch was effectuated, and the time of the switch. This information can be used in the post-production process to re-create the rough edit using higher quality data.

For example, during the performance, the director communicates with each of the camera operators. The director may direct his or her camera operators by saying, "Camera one, I want you to pick up character one, but then after this shot, cut away to camera two. Camera two, I want you to go out and pick up character two." A minute later the director might instruct "Cut to camera three with close-up shot of both characters." The director simultaneously uses the switch to select which view is to be actively used in the final edit. Therefore, the switched view comprises a sequence of views, starting with the view from camera one at a first time, followed by the view from camera two at a second time, and a subsequent view from camera three at a third time. Therefore, the camera operators are constantly being directed by the director, and a rough edit of the animated production is made during the performance. This process can be performed on the fly within a CG scene.

Each of the camera views are recorded simultaneously as separate video data streams. In addition, the switched view may also be recorded as a separate video data steam.

CG camera operators do not have the same constraints as real world camera operators. For example, real world cameras have to occupy space on a floor in front of a set, and camera operators have to be careful that they do not get physically in the other shots of the other cameras. There are no such limitations in the CG realm because the cameras are invisible to each other, and one can essentially have cameras pointing at each other, all viewing the same character, without seeing the other cameras. The cameras for CG can move with much more freedom than real world cameras. The director can make edits on the fly, which allows for adjustments to the performance as the scene is developing, rather than a later review of a scene that may take more time.

Figure 6:
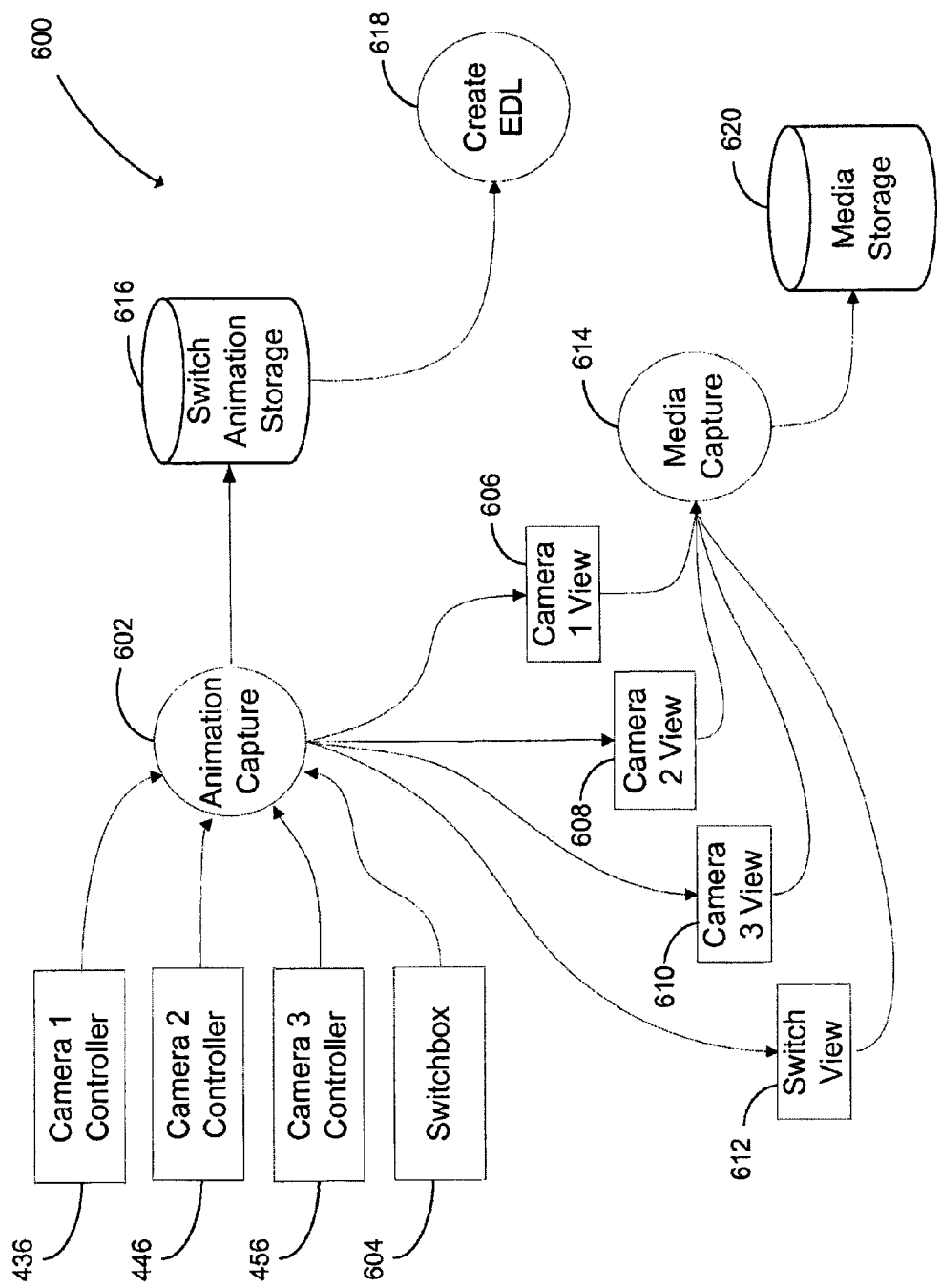
FIG. 6 illustrates a block diagram for the data flow from the camera controllers.

FIG. 6 illustrates a block diagram 600 representing the data flow in accordance with a system and method of producing an animated production using multiple cameras. The first camera controller 436, the second camera controller 446, and the third camera controller 456 receive inputs from camera operators. The inputs each indicate a reference point from which the animation scene should be captured. Based on the input received from the camera controllers, an animation scene is captured 602, and three different perspective views of the scene are created. That is, the first camera controller receives an input from an operator, and animation capture is performed to create a first camera view. The second camera controller likewise receives an input from an operator indicating a second reference point from which the animated scene should be captured. Based on the input from the second camera controller, a second camera view is created. Likewise, a third camera view is created based in the input received from the third camera controller 456.

Further, a switch 604 can be utilized to determine which view should be the active view at a given time. For instance, the director can utilize the switchbox 604 to select the desired view at a given time. Each time a switch instruction is received, the switch instruction is written to switch animation storage 616. The switch animation storage 616 may for example comprise a file detailing each time a switch was made, and which view was selected by the switch.

The different views, camera one view 606, camera two view 608, camera three view 610, and switch view 612 are each captured as indicated by media capture module 614. Each of the views are then stored to media storage 620. During the post-production process, the switch animation storage 616 and the media storage 620 are accessed to create an EDL.

As a result, a director can have a recording of the animated CG character from each of the reference points throughout a performance in addition to a rough edit recording of a particular sequence of reference points that the director switched to throughout the performance. The director can modify the rough edit by deleting certain portions of the rough edit and adding in portions from the recording of each reference point. For instance, the director may have switched a little too early from the camera 1 view 606 to the camera 2 view 608. In the rough edit, the director can delete the extra portion of the camera 2 view 608 and add in the portion of the camera 1 view that was recorded from the simultaneous recording by the cameras.

Figure 7:
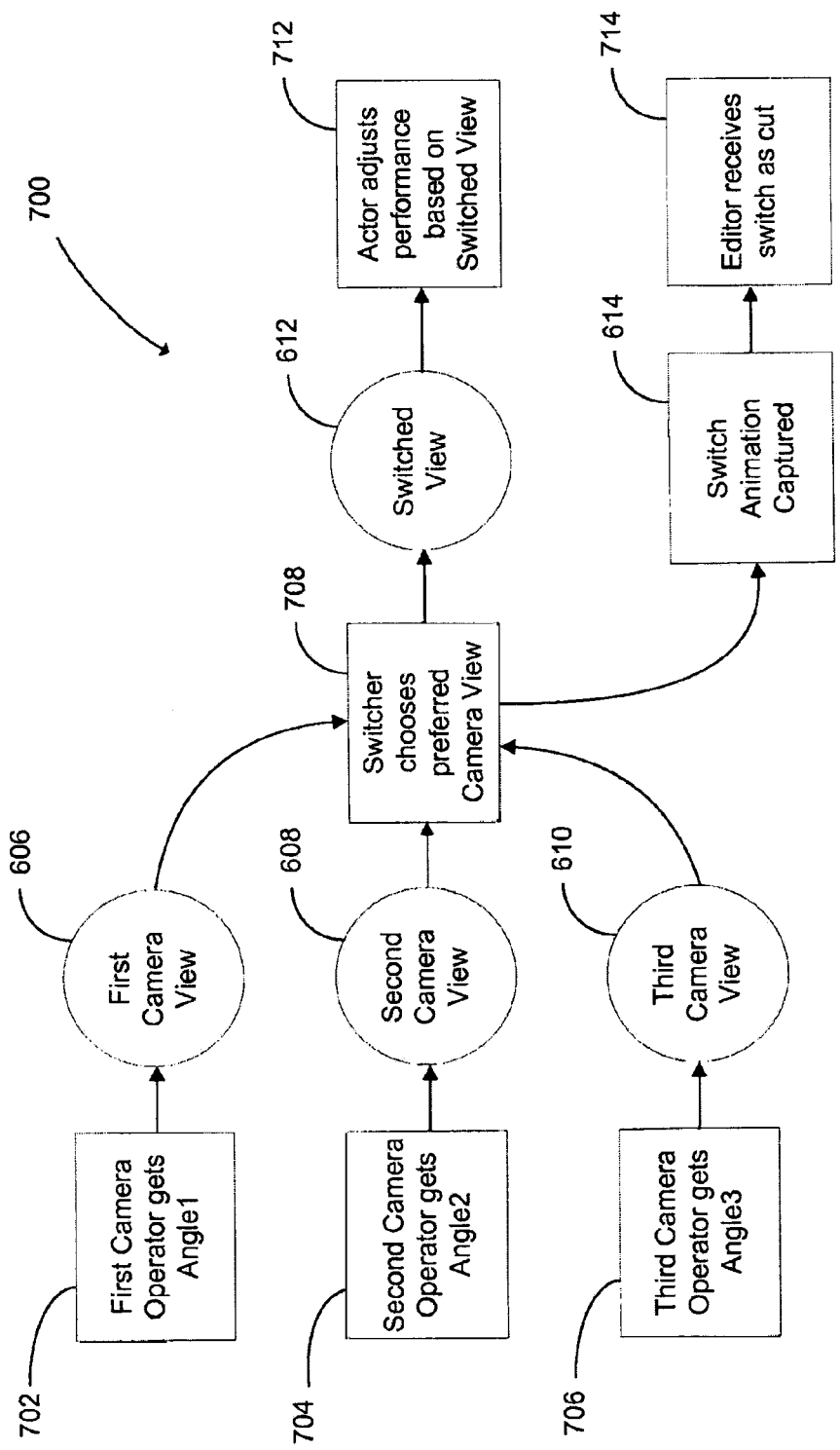
FIG. 7 illustrates a block diagram for the work flow from the camera controllers.

FIG. 7 illustrates a block diagram 700 for the work flow from the camera controllers. At a block 702, a first camera person can utilize the first camera controller 418 to obtain a first reference point, e.g., a first camera angle, which is the first camera view 606. Further, at a block 704, a second camera person can utilize the second camera controller 424 to obtain a second reference point, e.g., a second camera angle, which is the second camera view 608. In addition, at a block 706, a third camera person can utilize the third camera controller 430 to obtain a third reference point, e.g., a third camera angle, which is the third camera view 610. Each of these views is provided to a block 708, in which the switcher chooses the preferred view, or camera angle. The director can utilize the switcher to choose the reference point from which to record at a particular time in the performance. At a block 612, the view is switch from one view to another as indicated by the switcher. For instance, the view of the performance can be switched from the first camera view 606 to the second camera view 608. At a block 712, the actors perform according to the switch. Further, the angle that is switched to is provided to a block 710 which captures the switch animation. The switch is provided from the block 710 to the block 714 so that the editor receives the switch as a cut.

Figure 8:
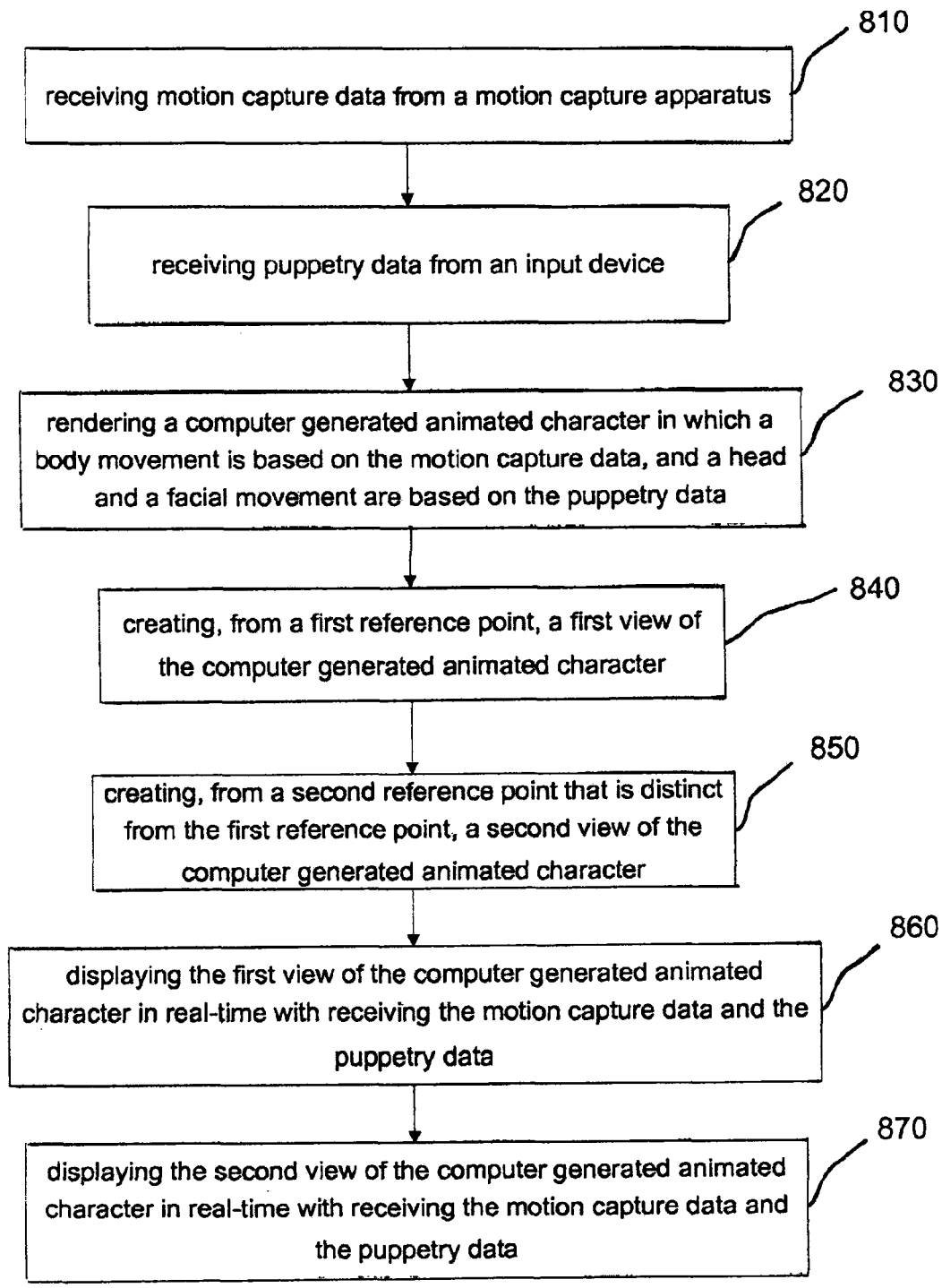
FIG. 8 illustrates a flow diagram of a method of producing an animated performance in real-time in accordance with one aspect of the present disclosure.

FIG. 8 illustrates a flow diagram of a method of producing an animated performance in real-time in accordance with one aspect of the present disclosure. The real-time method involves receiving motion capture data from a motion capture device that is configured to be worn on the body of a performer, as indicated at block 810. The motion capture device includes a plurality of markers. Further, the real-time method receives puppetry data from an input device, as indicated at block 820. A computer generated animated character is rendered, as indicated at block 830, in which a body movement is based on the motion capture data, and a head and a facial movement are based on the puppetry data. A first view of the computer generated animated character is created, from a first reference point, as indicated at block 840. Further, a second view of the computer generated animated character is created as indicated at block 850, the second view being from a second reference point that is distinct from the first reference point. As indicated at block 860, the real-time method displays the first view of the computer generated animated character in real-time with receiving the motion capture data and the puppetry data. The real-time method also displays the second view of the computer generated animated character in real-time with receiving the motion capture data and the puppetry data, as indicated at block 870.

A system and method for generating computer animated performances in real time, while further simulating multiple camera views or angles is hereby described.

Accordingly, the system and method described herein generates animated computer generated performances in real time. Further, the system and method described herein allows software to interpret the CG data and render a plurality of views based on the CG data. Each view mimics a different camera angle. Each of the plurality of views is displayed simultaneously and in substantially real time with the performance such that the performer can view his or her performance by viewing the display. The performer thereby has the capability to modify her or her performance accordingly.

Furthermore, information about each camera's position and which camera is live in the switch is recorded. Therefore, the system and method not only provide for switching between multiple cameras in real-time, but also recording what each camera sees at all times, where the camera is in the 3-D space, and which camera is live in any given moment within the real-time switch.

As a result, much faster production of animated presentations such as a television series can be provided for. Further, on the fly editing is provided for. In addition, there is a more realistic rendering of CG characters because the performer is able to view the animation of the CG character and adjust his or her movements accordingly.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method for use with a performer having a body, the method comprising:
   (1) receiving at least one of:
      (a) motion capture data from a motion capture device that is configured to be worn on the body of the performer during a performance, the motion capture device including a plurality of markers, and
      (b) puppetry data from an input device during a performance;
   (2) rendering a computer generated animated character in real-time with the received at least one of motion capture data and puppetry data;
   (3) creating, from a first reference point, a first view of the computer generated animated character;
   (4) creating, from a second reference point that is distinct from the first reference point, a second view of the computer generated animated character;
   (5) displaying the first view of the computer generated animated character in real-time with receiving the at least one of motion capture data and puppetry data;
   (6) recording the first view of the computer generated animated character;
   (7) displaying the second view of the computer generated animated character in real-time with receiving the at least one of motion capture data and puppetry data;
   (8) recording the second view of the computer generated animated character;
   (9) receiving a series of view switches between the first view and the second view in real-time as the first and second views are displayed;
   (10) recording the series of view switches independent of recording the first and second views;
   (11) displaying a lower animation quality rough first edit of an animated performance in real-time, the rough first edit comprising portions of the first view of the computer generated animated character and portions of the second view of the computer generated animated character displayed in accordance with the series of view switches;
   (12) synchronizing the recorded series of view switches between the first view and the second view, the recorded first view of the computer generated animated character, and the recorded second view of the computer generated animated character with each other; and
   (13) creating a higher animation quality second edit of the animated performance using the synchronized series of view switches between the first view and the second view, the recorded first view, and the recorded second view.

2. The method of claim 1, further comprising:
receiving an input from a camera controller to modify the first reference point during the displaying of the first view of the computer generated animated character; and
modifying the first reference point in response to receiving the input from the camera controller.

3. The method of claim 1, further comprising:
receiving an input from a camera controller to modify the second reference point during the displaying of the second view of the computer generated animated character; and
modifying the second reference point in response to receiving the input from the camera controller.

4. The method of claim 1, wherein creating the second edit of the animated performance using the recorded series of view switches between the first view and the second view, the recorded first view of the computer generated animated character, and the recorded second view of the computer generated animated character comprises:
re-rendering the recorded first view of the computer generated animated character;
re-rendering the recorded second view of the computer generated animated character; and
selecting portions of the re-rendered first view and the re-rendered second view for inclusion in the edit of the animated performance based on the recorded series of view switches between the first view and the second view.

5. The method of claim 4, wherein each of the view switches in the series of view switches occurs at a switching time, and creating the second edit of the animated performance using the recorded series of view switches between the first view and the second view, the recorded first view of the computer generated animated character, and the recorded second view of the computer generated animated character further comprises:

modifying the switching time of one or more of the view switches in the series of view switches.

6. A method for use with a performer, the method comprising:

receiving animation data from a device operable by the performer;

animating a computer generated character in real-time with the receiving of the animation data based on the animation data;

creating, from a first reference point, a first view of the animated computer generated character;

creating, from a second reference point that is distinct from the first reference point, a second view of the animated computer generated character;

displaying the first view of the animated computer generated character in real-time with receiving the animation data;

recording the first view of the computer generated animated character;

displaying the second view of the animated computer generated character in real-time with receiving the animation data;

recording the second view of the computer generated animated character;

receiving view switching information identifying when the first view is to be displayed and when the second view is to be displayed in a lower animation quality live edit of an animated performance;

recording the view switching information independent of recording the first and second views; and synchronizing the recorded view switching information, the recorded first view of the computer generated animated character, and the recorded second view of the computer generated animated character with each other for subsequent creation of a higher animation quality post-production edit of the animated performance using the synchronized view switching information, the recorded first view, and the recorded second view.

7. The method of claim 6, wherein the device comprises a motion capture device worn by the performer and configured to transmit motion capture data, and the animation data includes motion capture data received from the motion capture device.

8. The method of claim 7, further comprising:

determining a body movement of the computer generated character based on the motion capture data received from the motion capture device; and animating the computer generated character based on the body movement determined from the motion capture data.

9. The method of claim 7, wherein the motion capture device includes a plurality of markers.

10. The method of claim 6, wherein the device comprises an input device configured to transmit puppetry data, and the animation data includes puppetry data received from the input device.

11. The method of claim 10, further comprising:

determining a head movement or a facial movement of the computer generated character based on the puppetry data received from the input device; and animating the computer generated character based on the head movement or the facial movement determined from the puppetry data.

12. The method of claim 6, further comprising:

receiving an input from a camera controller to modify the first reference point during the displaying of the first view of the computer generated animated character; and modifying the first reference point in response to receiving the input from the camera controller.

13. The method of claim 6, further comprising:

receiving an input from a camera controller to modify the second reference point during the displaying of the second view of the computer generated animated character; and modifying the second reference point in response to receiving the input from the camera controller.

14. The method of claim 6, further comprising:

displaying the live edit of the animated performance.

15. The method of claim 6, further comprising:

re-rendering the recorded first view of the computer generated animated character;

re-rendering the recorded second view of the computer generated animated character; and selecting portions of the re-rendered first view and the re-rendered second view for inclusion in the post-production edit of the animated performance based on the view switching information.

16. The method of claim 15, further comprising:

after selecting portions of the re-rendered first view and the re-rendered second view for inclusion in the post-production edit of the animated performance, modifying when the first view is displayed and when the second view is displayed in the post-production edit of the animated performance.

17. A system for use with a performer, the system comprising:

an animation module stored on a memory configured to receive data representative of one or more movements made by the performer in real-time with the making of the movements, and to render a computer generated character, the movements of the computer generated character being based upon the one or more movements made by the performer;

a software module stored on the memory configured to create a first view and a second view of the computer generated character, the first view being based on a first reference point, and the second view being based on a second reference point, the first reference point being distinct from the second reference point;

a first controller configured to receive a first input to modify the first reference point and communicate the first input to the software module;

a second controller configured to receive a second input to modify the second reference point and communicate the second input to the software module, the software module being further configured to modify the first reference point in response to receiving the first input from the first controller, modify the second reference point in response to receiving the second input from the first controller, update the first view based upon a modification to the first reference point, and update the second view based upon a modification to the second reference point;

a recording device configured for recording the first and second views;

a switching device configured to selectively switch between the first view and the second view, the selective switching being recorded as a series of view switches independent of the recording of the first and second views;

a display configured to display in real-time a lower animation quality live edit of an animated performance, the live edit comprising portions of the first view of the computer generated character and portions of the second view of the computer generated character displayed in accordance with the series of view switches; and one or more editorial computing devices configured to synchronize the recorded series of view switches, the first view, and the second view, and to use the synchronized recorded series of view switches, the first view, and the second view to generate a higher animation quality post-production edit of the animated performance.

18. The system of claim 17, further comprising:
a first display for displaying the first view; and
a second display for displaying the second view.

19. The system of claim 17 wherein the first view and second view represent different camera angles.

20. The system of claim 17 wherein the first controller and the second controller each simulate a control of the motion of a camera dolly.

21. The system of claim 17, further comprising:
at least one rendering computing device configured to re-render the first view and the second view of the computer generated animated character, wherein the one or more editorial computing devices are further configured to select portions of the re-rendered first view and the re-rendered second view for inclusion in the post-production edit of the animated performance based on the recorded series of view switches, the first view, and the second view.

22. The system of claim 21, wherein each of the view switches in the series of view switches occurs at a switching time, and the one or more editorial computing devices are further configured to modifying the switching time of one or more of the view switches in the series of view switches.

* * * * *